(12) United States Patent
Waugh et al.

(10) Patent No.: US 11,121,885 B2
(45) Date of Patent: Sep. 14, 2021

(54) DATA ANALYSIS SYSTEM AND METHOD FOR PREDICTING MEETING INVITEES

(71) Applicant: Introhive Services Inc., Fredericton (CA)

(72) Inventors: Michael Waugh, Hanwell (CA); Jennifer Landry, Oromocto (CA); Jody Glidden, Miami Beach, FL (US)

(73) Assignee: INTROHIVE SERVICES INC., Fredericton (CA)

(*) Notice: Subject to any disclaimer, the term of this patent is extended or adjusted under 35 U.S.C. 154(b) by 0 days.

(21) Appl. No.: 17/063,672

(22) Filed: Oct. 5, 2020

(65) Prior Publication Data

US 2021/0105147 A1    Apr. 8, 2021

Related U.S. Application Data

(60) Provisional application No. 62/910,734, filed on Oct. 4, 2019.

(51) Int. Cl.
| | |
|---|---|
| *H04L 12/18* | (2006.01) |
| *G06Q 10/10* | (2012.01) |
| *H04L 29/08* | (2006.01) |

(52) U.S. Cl.
CPC ..... *H04L 12/1818* (2013.01); *G06Q 10/1095* (2013.01); *H04L 12/1822* (2013.01); *H04L 67/306* (2013.01)

(58) Field of Classification Search
CPC ............. H04L 12/1818; H04L 12/1822; H04L 67/306; G06Q 10/1095
See application file for complete search history.

(56) References Cited

U.S. PATENT DOCUMENTS

| | | | |
|---|---|---|---|
| 9,633,057 B2 | 4/2017 | Glidden | |
| 2009/0313075 A1* | 12/2009 | O'Sullivan | .......... G06Q 10/109 705/7.13 |
| 2016/0358065 A1* | 12/2016 | Gedge | ...................... G06N 7/00 |
| 2017/0372254 A1* | 12/2017 | Vainas | ............... G06Q 10/1093 |
| 2018/0293550 A1* | 10/2018 | Liang | ................. G06Q 10/1095 |
| 2019/0074987 A1* | 3/2019 | Wiener | ............... H04L 12/1822 |

\* cited by examiner

*Primary Examiner* — Esther B. Henderson
*Assistant Examiner* — Nazia Naoreen
(74) *Attorney, Agent, or Firm* — Ridout & Maybee LLP; David J. Greer

(57) ABSTRACT

Computer implemented method and a system that includes receiving a list of invitees for a future meeting, accessing electronically stored relationship data that includes information identifying a plurality of individuals and existing relationships between the individuals, wherein the individuals include at least some of the invitees and also additional individuals, selecting one or more of the additional individuals that are identified in the relationship data as having existing relationships with one or more of the invitees, and adding the one or more selected additional individuals to a potential invitee list for the future meeting.

16 Claims, 6 Drawing Sheets

TO... | Jane.Smith@companyA.com; Bob.Jones@companyA.com; jbrown@mycompany.com
Subject: | Statement of Work for Project X
Location: | Video Conference – see link below
Start Time: | Thu 10/3/2019 | 2:00pm
End Time: | Thu 10/3/2019 | 4:00pm

302

309

Send

Invitee Recomender 310

Video Conference Link: HTTPS:\Vclink.com\dgsfo57823587

Passcode

Recommended Invitees:

500

1) Brenda.Bond@companyA.com — Title: Legal Counsel — Department: Legal — ADD ? ☐

2) Jennifer.Grant@companyA.com — Title: IT Manager — Department: IT ☐

3) jsmith@mycompany.ca — Title: Support Engineer — Department: Eng. ☐
402                                                                          504

. . .

DONE 510

DATA ANALYSIS SYSTEM AND METHOD FOR PREDICTING MEETING INVITEES

REFERENCE TO RELATED APPLICATION

This application claims the benefit of and priority to the following application, the contents of which are incorporated herein by reference: U.S. Provisional Patent Application No. 62/910,734 entitled "System and Method for Meeting Invitee Recommendation", filed Oct. 4, 2019.

TECHNICAL FIELD

The present disclosure relates to automated systems and methods for data analysis to select individuals for invitations to meetings.

BACKGROUND

Enterprises such as companies, accounting firms, law firms, universities, partnerships, agencies and governments commonly use customer relationship management (CRM) systems and related technology to manage relationships, interactions and opportunities with other parties such as customers and potential customers.

In today's business environment, there are typically many meetings during a given time period, for example a day. One of the challenges today for enterprises is to ensure that the correct people are invited to each meeting to maximize the meeting benefits.

There are solutions in the market today that will recommend invitees based on the overlap of individuals that are currently invited to the meeting and individuals included in past meeting lists.

A problem is that these recommendation solutions are based primarily on the identity of the attendees of past meetings. The roles of individuals who have participated in past meetings may have changed since those meetings, and different types of meetings may require different types of attendees. For example, different meetings at different stages in a sales cycle may require different participants. Accordingly, these prior solutions may not reflect that the roles of the invitees recommended for a new meeting have changed, or that the meeting is a different type of meeting than prior meetings.

The foregoing examples of the related art and limitations thereto are intended to be illustrative and not exclusive. Other limitations of the related art will become apparent to those of skill in the art upon a reading of the specification and a study of the drawing.

SUMMARY

According to a first example aspect, a computer implemented method is disclosed that includes: receiving a list of invitees for a future meeting; accessing electronically stored relationship data that includes information identifying a plurality of individuals and existing relationships between the individuals, wherein the individuals include at least some of the invitees and also additional individuals; selecting one or more of the additional individuals that are identified in the relationship data as having existing relationships with one or more of the invitees; and adding the one or more selected additional individuals to a potential invitee list for the future meeting.

According some example embodiments of first example aspect, the stored relationship data includes role information that indicates, for at least some of the plurality individuals, a role of the individual within an organization that the individual is associated with, and the method includes selecting one or more of the additional individuals for addition to the potential invitee list based on the indicated role of the individual.

According some example embodiments of one or more of the preceding example aspects, selecting one or more of the additional individuals for addition to the potential invitee list based on the indicated role of the individual includes: accessing electronically stored historic meeting data about a plurality of past meetings, the historic meeting data including information indicating the invitees for the past meetings and roles of the invitees for the past meetings; selecting the one or more of the additional individuals based on the roles indicated in the historic meeting data for the invitees for the past meetings.

According some example embodiments of one or more of the preceding example aspects, selecting the one or more of the additional individuals based on roles indicated in the historic meeting data for the invitees for the past meetings includes selecting one or more past meetings based on a similarity of the past meetings to the future meeting; selecting the one or more of the additional individuals by selecting the additional individuals who have an indicated role that matches one or more of the roles indicated for the invitees for the selected past meetings.

According some example embodiments of one or more of the preceding example aspects, the method includes generating a future meeting profile that includes a plurality of attributes for the future meeting based on the invitees for the future meeting and information in the relationship data associated with the invitees; wherein selecting one or more past meetings based on a similarity of the past meetings to the future meeting comprises comparing attributes of the past meetings to the attributes included in the future meeting profile.

According some example embodiments of one or more of the preceding example aspects, the stored relationship data includes information that indicates, for at least some of the plurality individuals, opportunities that the individual is associated with, and the method includes: selecting one or more of the additional individuals for addition to the potential invitee list based on identifying individuals that are associated with opportunities that one or more of the invitees for the future meeting are also associated with.

According some example embodiments of one or more of the preceding example aspects, the stored relationship data includes relationship score information that indicates a perceived value of the existing relationships, wherein selecting one or more of the additional individuals for addition to the potential invitee list is based on the relationship score information.

According some example embodiments of one or more of the preceding example aspects, the relationship score information is based on communication activity history between individuals.

According some example embodiments of one or more of the preceding example aspects, receiving a list of invitees for a future meeting comprises extracting email addresses from an interactive meeting request form that is generated for a meeting organizer, the method further including extracting subject data, location data and meeting start and end time data from the meeting request form and generating a future meeting profile for the future meeting based on the extracted email addresses, extracted subject data and extracted location data, wherein adding the one or more selected additional individuals to the potential invitee list for the future meeting comprises filtering at least some of the selected additional individuals based on data included in the future meeting profile.

According some example embodiments of one or more of the preceding example aspects, the method includes generating a user interface output that presents at least some of the individuals included in the potential invitee list for the meeting organizer and, upon detecting a user input selecting one or more of the at least some of the individuals, automatically adding email addresses for the selected one or more of the at least some of the individuals to the interactive meeting request form as additional invitees for the future meeting.

According to a further example aspect, a computer implemented method is disclosed that includes: receiving a list of invitees for a future meeting; accessing electronically stored relationship data that includes information identifying a plurality of individuals and role information that indicates, for each of the individuals, a role of the individual within an organization that the individual is associated with, wherein the individuals include at least some of the invitees and also additional individuals; selecting one or more of the additional individuals that are identified in the relationship data based on the role information for the invitees and the additional individuals; and adding the one or more selected additional individuals to a potential invitee list for the future meeting.

According to yet a further example aspect is a system for determining potential invitees for a meeting, the system comprising a processor and non-transitory storage medium coupled to the processor, the storage medium storing software instructions that when executed by the processor configure the system to performed the method of any of the above example aspects.

BRIEF DESCRIPTION OF DRAWINGS

Exemplary embodiments are illustrated in the referenced figures of the drawings. It is intended that the embodiments and figures disclosed herein are to be considered illustrative rather than restrictive.

FIG. 5 is a further example of a user interface display presented on a user equipment device.

DESCRIPTION

Figure 1:
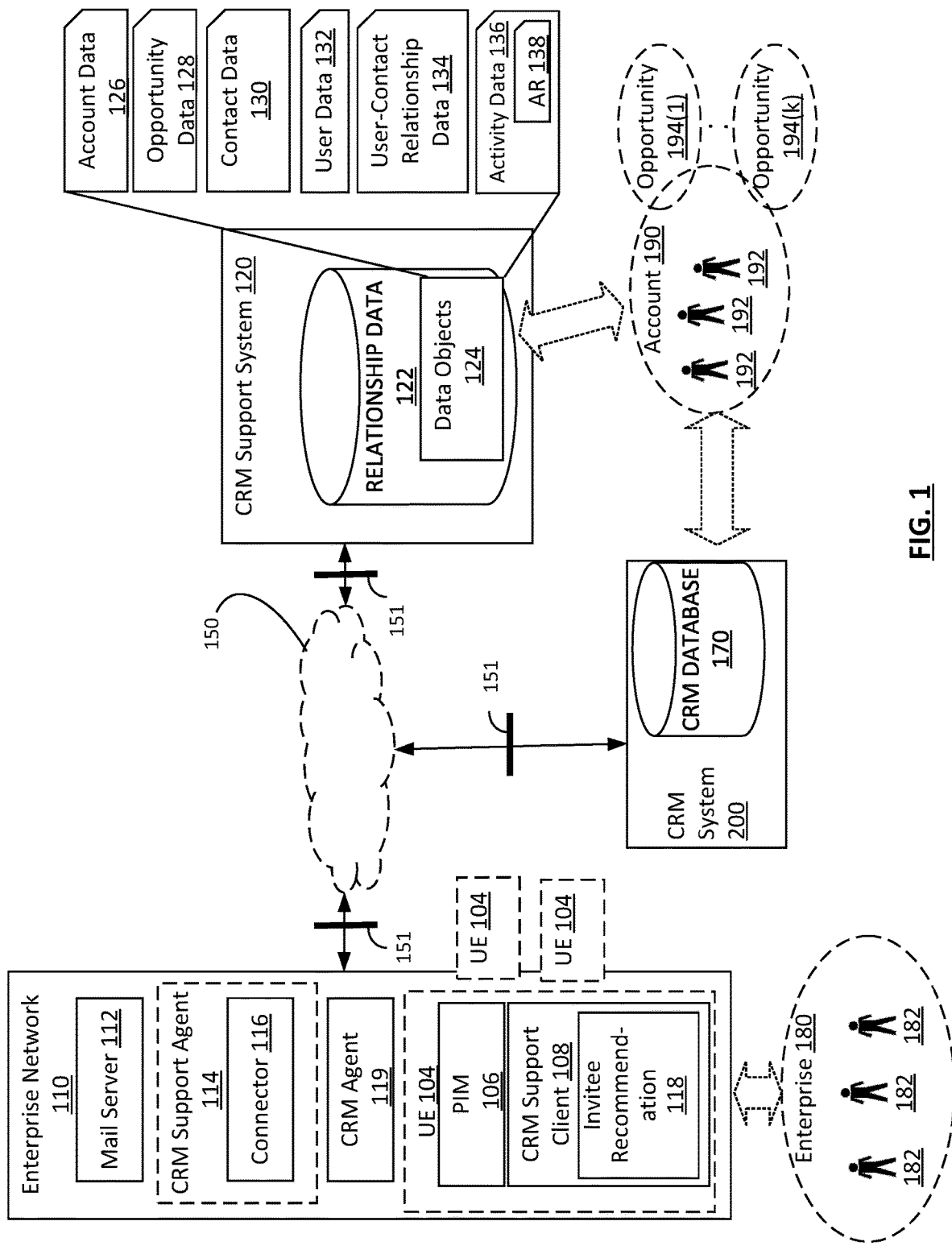
FIG. 1 is a simplified block diagram illustrating an environment that includes an enterprise network, a CRM, and a CRM support system in accordance with an example embodiment of the present disclosure.

The following embodiments and aspects thereof are described and illustrated in conjunction with systems, tools and methods which are meant to be exemplary and illustrative, not limiting in scope. In various embodiments, the above-described limitations of known solutions have been reduced or eliminated, while other embodiments are directed to other features.

Example embodiments of automated methods and systems are disclosed that collect and analyze information from various sources to compute recommendations for meeting invitees. In at least some example embodiments, the automated methods and systems disclosed herein may reduce the amount of interaction required between computer systems, and/or between an individual user and one or more computer systems, than might otherwise be required to discover the same, or less accurate information, using existing data analysis solutions. This may in turn reduce the computational resources and/or use (and thus wear-and-tear and depreciation) of user-computer interfaces and/or user resources that could otherwise be required in the absence of the presently disclosed solutions.

Example embodiments will now be described more fully hereinafter with reference to the accompanying drawings, in which some, but not all, embodiments of the invention are shown. The features and aspects presented in this disclosure may be embodied in many different forms and should not be construed as limited to the embodiments set forth herein. Where possible, any terms expressed in the singular form herein are meant to also include the plural form and vice versa, unless explicitly stated otherwise. In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Example embodiments are directed to systems and methods for generating meeting invitee lists that includes the correct individuals to arrive at a successful completion of a new opportunity. Some example embodiments function with a combination of data from a CRM system in conjunction with a database of client information and relationship measurements that are based on historic communication activities.

In some example embodiments, invitees can be recommended as a meeting is being organized. In some examples, invitees can be recommended for a meeting that has already been planned but has not yet occurred.

In example embodiments, key meeting information is identified based on data for a planned meeting that the meeting organizer is currently adding invitees for. This key meeting information could include, but is not limited to, meeting title/type of meeting, time of day, meeting location, invitees already added to the meeting, titles of the invitees, and departments of the invitees.

Information about contacts obtained from one or more of a CRM system, relationship database, and emails are reviewed to find associations between the contacts and the key meeting information such as, but not limited to, relationship strength with the meeting organizer, relationship strength with other meeting invitees, communication history, department, same company as other invitees, whether a contact is associated with open opportunities that other invitees are associated with, or if contacts that have a specific (or similar) title level with other invitees.

In example embodiments, invitees are recommended to a meeting organizer. This information may be, but is not limited to, presented to the meeting organizer within an email panel while the meeting organizer is adding invitees.

In an alternate embodiment, this information may be presented to the meeting organizer for all meetings that they currently have scheduled within a defined period of time (for example, all scheduled meetings in the next day, week, or month).

A representative use example is as follows. A meeting organizer (e.g., a representative of Enterprise Y) is setting up a meeting with company A about an opportunity X. The meeting organizer has invited their manager to the meeting and has invited the contact at company A that they have been primarily working on the opportunity with. An automated invitee recommendation module, as disclosed hereon, is configured to review the meeting information, the contact information available, patterns from similar opportunity meetings from past opportunities and recommend that the meeting organizer invites the department manager for the contact at company A, and/or another contact at company A that the meeting organizer has a strong relationship with from a past successful opportunity.

Throughout the following description, specific details are set forth in order to provide a more thorough understanding to persons skilled in the art. However, well known elements may not have been shown or described in detail to avoid unnecessarily obscuring the disclosure. Accordingly the description and drawings are to be regarded in an illustrative, rather than a restrictive, sense.

FIG. 1 illustrates an example environment in which the methods and systems described in this disclosure may be implemented. In the example of FIG. 1, the environment includes an enterprise network 110 that supports an enterprise such as a company, firm or other type of organization (referred to in this disclosure as "enterprise 180"). In example embodiments, a plurality of individuals are registered or otherwise associated with the enterprise network 110 as users 182 of the enterprise 180. These individual users 182 may be authorized representatives of the enterprise 180, for example employees, owners, partners, consultants, volunteers, and interns. In some examples, enterprise 180 could have as few as one user 182, and in some examples, enterprise 180 may have thousands or more users 182.

At any given time the enterprise 180 has, or is, pursuing commercial or other types of relationships with one or more external entities, referred to in this disclosure as "accounts" 190. For example, such external entities could be existing or potential customers, clients or donors or other entities of interest to the enterprise, and may include, among other things, companies, partnerships, universities, firms, government entities, joint venture groups, non-government organizations, charities and other types of entities. Typically, each account 190 will have an associated set of individual representatives or contacts, referred to in this disclosure as "contacts" 192. For example, the individual contacts 192 associated with an account 190 may be employees, owners, partners, consultants, volunteers, and interns of the account 190. Furthermore, at any given time the enterprise 180 will typically have completed or will be pursuing one or more opportunities 194(1) to 194(k) (with k being account dependent and representing a total number of open and closed opportunities with a specific accounts). In this disclosure, the reference "opportunity 194(j)" will be used to refer a generic individual opportunity, and "opportunities 194" used to refer to a generic group of opportunities. An opportunity 194(j) may for example be a sales opportunity to sell a product or service, and may have an opportunity lifetime (e.g., duration of time from recognition of existence of the opportunity to closing of the opportunity) that can be divided into a set of successive stages or steps such as the seven basic stages of a sales cycle (e.g., Prospecting, Preparation, Approach, Presentation, Handling objections, Closing).

Enterprise network 110 may, for example, include a plurality of computer devices, servers and systems that are associated with the enterprise 180 and are linked to each other through one or more internal or external communication networks, at least some of which may implement one or more virtual private networks (VPN).

In example embodiments, the environment of FIG. 1 also includes a CRM support system 120 and a CRM system 200, each of which may also include one or more computer devices, servers and systems. One or both of CRM support system 120 and CRM system 200 may, in some examples, be operated by third party organizations that are service providers to the enterprise 180 associated with enterprise network 110. CRM support system 120 and a CRM system 200 are configured to track customer data (e.g., information about accounts 190, account contacts 192 and account opportunities 194) on behalf of enterprise 180.

In the illustrated example, enterprise network 110, CRM support system 120, and CRM system 200 are each connected to a common communication network 150. Communication network 150 may for example include the Intranet, one or more enterprise intranets, wireless wide area networks, wireless local area networks, wired networks and/or other digital data exchange networks. Respective firewalls 151 may be located between the communication network 150 and each of the enterprise network 110, CRM support system 120, and CRM system 200. In different example embodiments, one or more of the features or functions of CRM support system 120 and CRM system 200 that are described herein could be alternatively be implemented in a common system or implemented within the enterprise network 110.

Enterprise Network 110

Enterprise network 110 includes at least one mail server 112 for handling and delivering external email that enterprise network 110 exchanges with remote mail servers through communication network 150. Thus, mail server 112 contains emails sent/received by the enterprise associated with enterprise network 110. In some examples, mail server 112 may also handle internal emails that are internal within enterprise network 110.

In example embodiments, enterprise network 110 includes a CRM agent 119 that provides the enterprise network 110 with an interface to CRM system 200.

In example embodiments, enterprise network 110 also includes a CRM support agent 114 that provides the enterprise network 110 with an interface to CRM support system 120. In example embodiments, CRM support agent 114 includes a connector 116. As described in greater detail below, connector 116 is configured to interact with systems within the enterprise network 110 (such as mail server 112 and user equipment (UE) devices 104) to extract information about activities (such as communication activities) and provide that information to CRM support system 120. As will also be described in greater detail below, an invitee recommendation module 118 is configured to interact with CRM system 200 and CRM support system 120 to provide, among other things, intelligent information about which contact would most likely be the decision maker for a given opportunity.

In example embodiments, enterprise network 110 supports a plurality of UE devices 104. Each enterprise user 182 is associated with one or more respective UE devices 104.

In example embodiments, a UE device 104 may be a smartphone, computer tablet, laptop computer, desktop personal computer, wearable electronic device or other communication enabled computer device. In example embodiments, UE devices 104 are configured with a personal information manager (PIM) module 106. Among other things, the PIM module 106 includes an email client, as well as one or more other functions such as calendaring, task managing, contact managing, note-taking, journal logging, and web browsing functions. The PIM module 106 will typically store associated PIM data that includes, among other things, user calendar data, user address book data, user email data and user messaging data. Examples of PIM modules 106 include modules that support basic communications and scheduling services that the user of a UE device 104 is registered with, such as Google Gmail™, Microsoft Outlook Exchange Web Service, and/or Lotus Domino. In example embodiments, some or all of the PIM data associated with a user 182 may be stored locally on the UE device 104 associated with the user, and in some examples, all or parts of the PIM data may be stored at a remote server hosted by or for enterprise network 110 that is accessible through a communication network to the UE device 104. In various embodiments, some or all of the PIM data for users 182 that is stored at UE devices 104 or other remote server is accessible to CRM support agent 114. In some examples, one or more connector modules 116 are associated with CRM support agent 114 to enable the CRM support agent 114 to periodically retrieve the PIM data of registered users 182.

In example embodiments, UE devices 104 each include a CRM support client 108 that is configured to interface with the connector 116 of CRM support agent 114 to support the systems and methods described herein, including the exchange of PIM data described above. In example embodiments, a user 182 may have multiple associated UE devices 104 across which PIM data is synchronized. In some examples, a UE device 104 associated with a user could be a virtual device (e.g., a user virtual desktop) that is hosted by a server within enterprise network 110 and accessed by a remote access device (e.g., a thin client device).

In example embodiments, the CRM support client 108 of a UE device 105 includes, or has access to, an invitee recommendation module 118 that is configured to compute invitee recommendations as described below.

CRM System 200

In example embodiments, CRM system 200 may be implemented using a known CRM solution such as, but not limited to, Salesforce.com™, Microsoft Dynamics™, InterAction™ or Maximizer™, and includes a CRM database 170 that includes customer data (e.g., CRM data) for accounts 190 is desirous of tracking. The CRM data that is stored in a CRM database 170 for an account 190 may for example include: (I) general account data, (II) opportunity data about specific opportunities 194 that the enterprise 180 has undertaken in the past, is currently undertaking, or is proposing to undertake in the future with the account 190, and (III) individual contact data that includes contact information for individual contacts 192 who represent or are otherwise associated with the account 190.

CRM Support System 120

In example embodiments, CRM support system 120 is configured to provide enhanced CRM information and functionality that supplements CRM System 200. CRM support system 120 includes a relationship data storage 122 for storing relationship data generated in respect of the accounts 190 of interest to enterprise 180. In example embodiments, similar to CRM database 170, relationship data storage 122 may store, in respect of each account 190 (e.g. each customer or client of enterprise 180), relationship data objects 124 that include: (I) account data 126 that provide general information about the account 190, (II) opportunity data 128 about specific opportunities that the enterprise has undertaken in the past, is currently undertaking, or is proposing to undertake in the future with the account 190, (III) individual contact data 130 that includes contact information for individual contacts 192 (e.g., employees) who are associated with the account 190, (IV) user data 132, that includes information about enterprise users 182 who are involved in the relationship with an account 190, (V) user-contact relationship strength data 134, and (VI) activity data 136 that includes information about activities between enterprise 180 and account 190. The data in relationship data storage 122 may include some or all of the information stored at CRM database 170, as well as supplemental information.

In example embodiments, the CRM Support System 120 interfaces with connector 116 of CRM support agent 114 and other possible data sources to collect and update of data stored in relationship data storage 122. In some examples, the CRM support system 120 is configured to periodically refresh (e.g., for example on a timed cycle such as once every 24 hours) the content of data objects 124 such that the data maintained in relationship data storage 122 always includes current or near-current information. The CRM support system 120 may periodically refresh the information stored in relationship data storage 122 based on information from a plurality of sources. For example, CRM support system 120 may obtain data from the CRM database 170 of CRM system 200, from sources within enterprise network 110, and from other data sources that are available through communication network 150.

Account data 126: In example embodiments, the basic data included in account data 126 stored at relationship data storage 122 may include, for each account 190, some or all of the fields listed in the following Table 1, among other things:

TABLE 1

Account Data Fields:

| Field | Field Description |
|---|---|
| Enterprise ID | Unique identifier assigned to Enterprise 180 |
| Account ID | Unique identifier assigned to Account 190 |
| Account Industry Code | Code that identifies primary industry type of customer organization (e.g., Standard Industrial Classification (SIC) Code and/or North American Industry Classification System (NAICS) Codes) |
| Number of Employees | Number of Employees of Account Organization |
| Account Size Score | Score assigned based on size of account organization (e.g., organization size of 1500+ employees = 10 points; 1000 to 1500 = 9 points; 750-1000 = 8 points, etc.) |
| Account Annual Revenue | Annual Revenue of account organization for one or more previous years |
| Owner User ID | User ID of enterprise user 182 who owns the account (e.g., user 182 who has primary responsibility for enterprise-account relationship) |
| Name | Name of Account (e.g., company or |

TABLE 1-continued

Account Data Fields:

| Field | Field Description |
|---|---|
| | organization name) |
| Top User-Account Relationship | The enterprise user 182 that has the strongest relationship with the account 190 |
| Account Active/Inactive Indicator | Indicates that Account is currently an active account of the enterprise or currently inactive |

The fields "Account Active Indicator" can be used for an indicator that indicates if an account is currently active or is not currently active (e.g., inactive). In some embodiments, an active account is an account 190 that the enterprise 180 currently has an open opportunity with, or is a current customer or client, or has been a customer or client within a predefined prior time duration (e.g., within last year). In some examples, inactive accounts can be classified as historic accounts or prospective accounts. Inactive historic accounts may for example be previously active accounts that have been dormant (e.g., no open opportunities and currently not a current customer or client) for greater than a predefined prior time duration (e.g., more than one year). Inactive prospective accounts may for example be potential accounts that were never active but that are of interest to enterprise 180, for example organizations in an industry of interest to the enterprise 180, but whom the enterprise has not yet started prospecting.

Opportunity data 128: In example embodiments, the basic data included in opportunity data 128 stored at relationship data storage 122 may include, for each opportunity with each account 190, opportunity records that include some or all of the fields listed in the following Table:

TABLE 2

Opportunity Data Fields:

| Field | Field Description |
|---|---|
| Opportunity ID | Unique identifier assigned to Opportunity |
| Account ID | Account ID of the account that is the target of the opportunity |
| Created Date | Date opportunity registered with CRM support system |
| Closed Indicator | Indicates if opportunity is closed |
| Closed Date | Date Opportunity was closed |
| Current Stage | Indicates current stage of open opportunity (e.g., Prospecting, Preparation, Approach, Presentation, Handling objections, Closing) |
| Won Indicator | Indicates opportunity closed successfully (e.g., with a sale) |
| Opportunity Size Score | Score that represents a size or dollar value of the opportunity |
| Main Contact ID | Contact ID of lead contact for opportunity with the account |
| Main User ID | Contact ID of lead user for opportunity |
| Last Activity Date | Date of most recent activity recorded in respect of opportunity |
| Event ID | ID of marketing event that resulted in Opportunity (if known) |

Contact data 130: In example embodiments, the basic data included in contact data 130 stored at relationship data storage 122 may include, for each contact 192 at account 190, contact records that include some or all of the fields listed in the following Table 3, among other things:

TABLE 3

Contact Data Fields:

| Field | Field Description |
|---|---|
| Contact ID | Unique contact identifier |
| Active/Inactive Indicator | Indicates if contact is active or inactive |
| Date Created | Date contact added |
| Account ID | Account ID of the account the contact is associated with (referred to as "contact's account") |
| Department | Name of contact's department in contact's account |
| Account Industry Code | Industry Code for contact's account |
| Position/Title | The position/title of the contact in contact's organization |
| Title Score | Hierarchal Score assigned to Contact based on contact's position at contact's organization (e.g., may be defined by a look up table that maps position titles to scores: president = 20 points, CEO = 20 points, VP = 18 points, senior manager = 14 points; partner = 16 points, etc.) |
| Contact-Enterprise Relationship Score | Score That Indicates Perceived Value of the Relationship with the Contact |
| First Name | Contact's First Name |
| Last Name | Contact's Last Name |
| Full Name | Contact's Full Name |
| Primary Email | Contact's Primary Email |
| Primary Phone | Contact's Primary Phone |
| Preferred Marketing Event | Preferred Event Type for Contact |
| Contact Origination Type | Type and ID of activity or event that caused contact to be added as an Active Contact (e.g., email communication activity, meeting communication activity, new outlook or other personal information management system contact addition) |
| Image | One or more images obtained from on-line sources (e.g., Linked-In ™ profile picture) |
| Opportunity ID(s) | ID's of opportunities that the contact is associated with |

As noted above, contacts can be indicated as active or inactive. In example embodiments, an active contact can be a contact that has been a party to an activity (as tracked in activity data 136 below) within a predefined prior time period (e.g., last 18 months) and/or meets other pre-defined criteria including for example criteria as set by privacy and solicitation legislation or regulations. Inactive contacts are contacts that are not currently active and may in some examples be classified in one or more categories such as inactive historic contacts (e.g., contacts that were previously active contacts), and inactive prospective contacts (e.g., contacts working in industries that are of interest to the enterprise or with active accounts, but who are not historic contacts).

User data 132: In example embodiments, the basic data included in user data 132 stored at relationship data storage 122 may include, for each user 182 that has a relationship with a contact 192 at the account 190, user records that include some or all of the fields listed in the following Table 4, among other things:

TABLE 4

User Data Fields:

| Field | Field Description |
|---|---|
| User ID | Unique user identifier |
| Account ID | Account ID of the subject account |
| Department | Name of user's department in the enterprise organization |
| Title | Title/position of user within enterprise organization |
| User-Account Relationship Score (*) | Score That Indicates Perceived Value of User's Relationship With Account |
| Opportunity ID (*) | Opportunity ID for opportunity for which user is member of the enterprise team (e.g., selling team) |

(*) indicates fields that can be repeated for multiple accounts/opportunities

User-Contact Relationship data 134: In example embodiments, the basic data included in user-contact relationship data 134 stored at relationship data storage 122 includes information for each known user-contact relationship that exists between a user 182 within enterprise 180 and a contact 192 within an account 190. User-contact relationship records included in user-contact relationship data 134 may, for example, include some or all of the fields listed in the following Table 5, among other things:

TABLE 5

User-Contact Relationship Data Fields:

| Field | Field Description |
|---|---|
| User ID | Unique user identifier |
| Contact ID | Contact Unique Identifier |
| Account ID | Contact's Account |
| Start Date | Date when relationship between user and contact started |
| Relationship Origination Indicator | Activity ID and/or event ID of the activity/event that first triggered Contact/user relationship |
| Active Indicator | Indicates if relationship is currently active |
| User-Contact Relationship Score | Score that indicates perceived strength of User-Contact Relationship Strength |
| Last Activity Date | Date of last recorded activity including user and contact |

Activity data 136: In example embodiments, the activity data 136 stored at relationship data storage 122 may include data for activities related to the entity-account relationship. Activities may for example include communication activities and documentation activities among other things.

Activity data 136 may include respective activity records 138 for each logged activity. Table 6 below provides a generic example of fields that may be included in an activity record 138, depending on the type of activity and availability of information:

TABLE 6

Activity Data Fields:

| Field | Field Description |
|---|---|
| Activity ID | Unique identifier assigned to activity |
| Account ID* | Identity of Account whose contacts participated in the activity |
| Opportunity ID* | Identity of the opportunity(ies) that activity related to |

TABLE 6-continued

Activity Data Fields:

| Field | Field Description |
|---|---|
| Activity Type Indicator | Value that identifies the type of activity (e.g., (i) communication activity: incoming email, outgoing email, incoming meeting request/calendar invite, outgoing meeting request/calendar invite, incoming phone call, outgoing phone call, in-person meeting, virtual meeting, (ii) documentation activity: proposal submitted, draft statement of work (SOW) submitted; final SOW submitted; contract submitted for review). |
| Document ID | ID of document template (can be used to identify content of standard form email in the form of a communication action, or to identify document template in case of documentation activity) |
| Start Time | Date and time stamp indicating start of activity |
| Activity Duration | Duration of activity (e.g., length of meeting or phone call) |
| Sentiment Indicator | Indicator provided manually or by natural language processing algorithm as to sentiment of activity (e.g.: negative to positive sentiment on scale of 1 to 5, in example embodiments, may be determined at CRM support agent 114 and sent by connector 116 to data tracking module 122) |
| Content Count* | Counts number of occurrences of predefined words in communication activity (e.g., product name, competitor product name). (In example embodiments, may be determined at CRM support agent 114 and sent by connector 116 to data tracking module 122) |
| Participants - Account* | Contact IDs or other available identifier for all individuals involved on account side of activity |
| Participants - Enterprise* | User IDs or other available identifier for all individuals involved on enterprise side of activity |

*Indicates fields that will be repeated as required

In at least some examples, the fields that are included and/or populated in an activity record 138 may be dependent based on the type of activity. For example, Table 7 below indicates fields that may be included in respect of an activity record 138 that is generated by CRM support system 120 for a meeting. Table 7 includes some of the fields of table 6, as well as additional fields.

TABLE 7

Meeting Activity Data Fields:

| Field | Field Description |
|---|---|
| Activity ID | Unique identifier assigned to activity |
| Meeting ID | Unique identifier assigned to meeting (e.g., may be value assigned by scheduling PIM module) |
| Account ID* | Identity of Account(s) whose contacts participated in the meeting |
| Opportunity ID | Identity of the opportunity that meeting is related to |
| Meeting Organizer | User ID of enterprise user that organized meeting (e.g., generated the meeting invite) |

TABLE 7-continued

Meeting Activity Data Fields:

| Field | Field Description |
| --- | --- |
| Subject | Information included in meeting "Subject" field by meeting organizer. |
| Location | Information included in meeting "Location" field by meeting organizer |
| Start Time | Scheduled Start Date and Time for meeting |
| End Time | Scheduled End Date and Time for meeting |
| Additional Information | Additional descriptive information about meeting (e.g., information included in the open format field of a meeting scheduling form) |
| Invitees - Account* (ID/Title/Department) | Contact IDs or other available identifier and title/department information for all individuals involved on account side who where invited (in some examples, may be limited to invitees who did not decline; separate lists may be used for invitees who decline; invitees who confirmed attendance; invitees who did not respond) |
| Invitees - Enterprise* (ID/Title/Department) | User IDs or other available identifier and title/department information for all individuals involved on enterprise side of meeting (including meeting organizer and all other invitees that are enterprise users 182) |
| Meeting Type | Meeting Type: In-person Virtual Combination of In-Person and Virtual |
| Average Enterprise-Contact Relationship Score | Average Enterprise-Contact Relationship Score of invitees |
| Average Title Score | Average Title score of invitees |

Data Object Storage and Collection: In example embodiments, the CRM support system 120 includes both current and historic records in data objects 124, enabling changes in data, including data of the type included in the data object fields noted above, to be compared and plotted over time. For example, current and historical time-stamped versions of the records (or selected data fields) included as data objects 124 may be stored at relationship data storage 122.

The data included in data objects 124 in relationship data storage 122 may be obtained by CRM support system 120 from different sources using different methods. For example, some information may be collected from enterprise users 182 through data entry provided through user interfaces supported by CRM support agent 114. Some information may be gathered from third party data providers (e.g., contact information and account information pertaining to inactive prospective accounts and contacts, and supplementary information regarding contacts 192 and accounts 190). Some information may be gathered directly or indirectly (for example via CRM agent 119) from CRM system 200. Some information may be gathered through automated monitoring of enterprise network 110 activities and events, including activities at mail server 112 and UE device PIM 106 activities such as email activities, calendar activities and contact management activities. CRM support system 120 may be configured to perform periodic email, calendar and contact synchs with CRM support agent 114 for updates.

By way of example, in the case of activity data 136, in example embodiments, CRM support agent 114 is configured to automatically collect information about communication activities between users 182 associated with the enterprise 180 and external contacts 192 associated with an account 190. These communication activities may for example be electronic communications such as email, meetings that are tracked in calendar systems and/or scheduled through email communications, and telephone calls that occur through a system that enables call logging. Each of these interactions have associated electronic data that includes a contact identifier (e.g., email address or phone number for contact 192), time stamp information for the interaction, and a user identifier (e.g., data that identifies the user(s) 182 of the enterprise 180 and account contacts 192 that were involved in the communication activity).

In example embodiments, CRM support agent 114 is configured to collect the information about communication activities by interacting with devices and systems that are integrated with enterprise network 110 and generate reports that are sent to CRM support system 120 automatically on a scheduled basis or when a predetermined threshold is met or a predetermined activity occurs. In some examples, CRM support agent 114 may collect information from an enterprise mail server 112 located within enterprise network 110 and/or from PIM modules 106 associated with UE devices 104, via the connector 116.

In some examples, connector 116 may collect information from the mail server 112. For example, in some embodiments connector 116 is configured to intermittently run a batch process to retrieve email messages from the mail server 112 so that communication activity data can be derived from the email messages and provided through communication network 150 to the relationship database 122. In some examples, the connector 116 is configured to extract selected information from email messages as contact interaction data. For each email message, the extracted information may for example include any external email address included in the sender, recipient and carbon copy (CC) and blind carbon copy (BCC) recipient email address fields, along with a send or receive timestamp applied to the email message by the mail server 112. In example embodiments, the extracted information can also include information that identifies any enterprise users 182 that are participating in the email as sender or recipient or CC recipient. In example embodiments, the extracted information can also include information that identifies any account members 192 that are participating in the email as sender or recipient or CC recipient.

In example embodiments, meeting requests and invites will be included among the email messages that are processed by mail server 112, and connector 116 is configured to include email addresses in the meeting invitee list and organizer fields in the contact interaction data extracted from the emailed meeting invite. In some examples, connector 116 may also be configured to interface with CRM support clients 108 to receive data from the PIM modules 106 of UE devices 104 associated with the enterprise network 110. In some examples where enterprise network 110 supports phone call logging, for example in Voice-Over-Internet-Protocol (VOIP) implementations, connector 116 may be further configured to interact with a VOIP server to collect information about external phone numbers used for outgoing and internal calls for inclusion in communication activity data.

Relationship Scoring

It will be noted that a number of the data objects 124 include relationship scoring information that assign values to relationships based on metrics described in greater detail below. For example, relationship scores can include: account data 126 includes a "Top User-Account Relationship" that identifies the enterprise user 182 that has a highest overall relationship score with the subject account 190; contact data 130 includes a "Contact-Enterprise Relationship Score" that that indicates a perceived value of the relationship of enterprise 180 with the subject contact 192; user data 132 includes a "User-Account Relationship Score" that indicates perceived value of user's relationship with contact; and user-contact relationship data includes a "User-Contact Relationship Score" that indicates perceived strength of the user-contact relationship.

According to example embodiments, the CRM support system 120 is configured with a set of relationship score prediction models for computing each of the respective relationship scores. In at least some examples, these scores are calculated by CRM support system 120 based on communication activities between enterprise users 182 and account contacts 192, such as the communications activities that are tracked as part of activity data 136. By way of example, the user-contact relationship score for an enterprise user 182-account contact 192 could be based on a communication score that is based on features such as, among other things: activity type (e.g., incoming email, outgoing email, incoming meeting request/calendar invite, outgoing meeting request/calendar invite, incoming phone call, outgoing phone call, in-person meeting, on-line meeting, video conference); frequency (e.g., number of communication activities with a defined time period); recentness of communication activities; and length of communication activity, among other things.

By way of illustrative non-limiting example, a communication score based on frequency of communication, recentness of communication, and type of communication could be determined based on a pre-defined model or algorithm such as follows:

> Raw communication score=(total number incoming emails in last week from contact listing user as direct or CC recipient)*($W1$)+(total number outgoing emails in last week from user listing contact as direct or CC recipient)*($W2$)+(total number of phone calls, in-person meetings, and virtual meetings involving both user and contact in last week)*($W3$)+(total number incoming emails in last month from contact listing user as direct or CC recipient)*($W4$)+(total number outgoing emails in last month from user listing contact as direct or CC recipient)*($W5$)+(total number of phone calls, in-person meetings, and virtual meetings involving both user and contact in last month)*($W6$)+(total number incoming emails in last 6 moths from contact listing user as direct or CC recipient)*($W7$)+(total number outgoing emails in last six months from user listing contact as direct or CC recipient)*($W8$)+(total number of phone calls, in-person meetings, and virtual meetings involving both user and contact in last week)*($W9$)+(total number of all communications activities involving both user and contact over lifetime of user-contact relationship)*($W10$)

Where: W1 to W2 are predetermined weights. (e.g., W1=W2=7; W3=8, W4=W5=5, W6=6; W7=W8=3; W9=4; W10=1).

In further example embodiments, the communication score may be determined using a learned model that has been learned using machine learning techniques based on historic communication and relationship data.

In example embodiments the raw communication score may be normalized to a communication score based on comparison with historical data and/or data for other user-contact relationships or other scaling methodology to a range (for example 0 to 1). In some examples, the normalization may be based on data limited to the enterprise. In some examples, the normalization may be based on data from an industry. In some examples, normalization may be related to a specific account. In some examples, a communication momentum value may be based on trends over time in the metrics represented in the raw score calculation noted above.

In some examples a User-Contact Relationship Score could be a composite of the contacts title score and a communication score based on the above attributes (e.g., contact title score*communication score). In some examples the User-Contact Relationship Score may be decided based only on the communication score. In some example embodiments, User-Contact Relationship Score could be represented as a discrete ranking within a relative scale such as "3=high", "2=medium", "1=low".

In some examples, "Contact-Enterprise Relationship Score" could be based on a combination (e.g., sum or product) of all of the individual User-Contact Relationship Scores that a contact 192 has with users 182 of enterprise 180. In some examples, a "User-Account Relationship Score" could be based on a combination (e.g., sum or product) of all of the individual User-Contact Relationship Scores that a user 182 has with account contacts 192. In some examples, the "Contact-Enterprise Relationship Score" could be based on a combination of all the individual User-Contact Relationship Scores across all user-contact relationships between an enterprise 180 and an account 190.

Further examples of relationship scoring techniques that can be applied are described in U.S. Pat. No. 9,633,057, issued Apr. 25, 2017, the content of which is incorporated herein by reference.

Invitee Recommendation

As noted above, in example embodiments an invitee recommendation module 118 is provided to generate recommendations for meeting invitees. In some examples, invitee recommendation module 118 may be part of the CRM support client 108 that is running on a UE device 104. In some examples, functionality of invitee support module 118 may be split between UE devices 104 and a CRM support agent 114. In some examples, some or all of the functionality of invitee support module 118 could be hosted at a remote server located within enterprise network 110 or at CRM support system 120.

Figure 2:
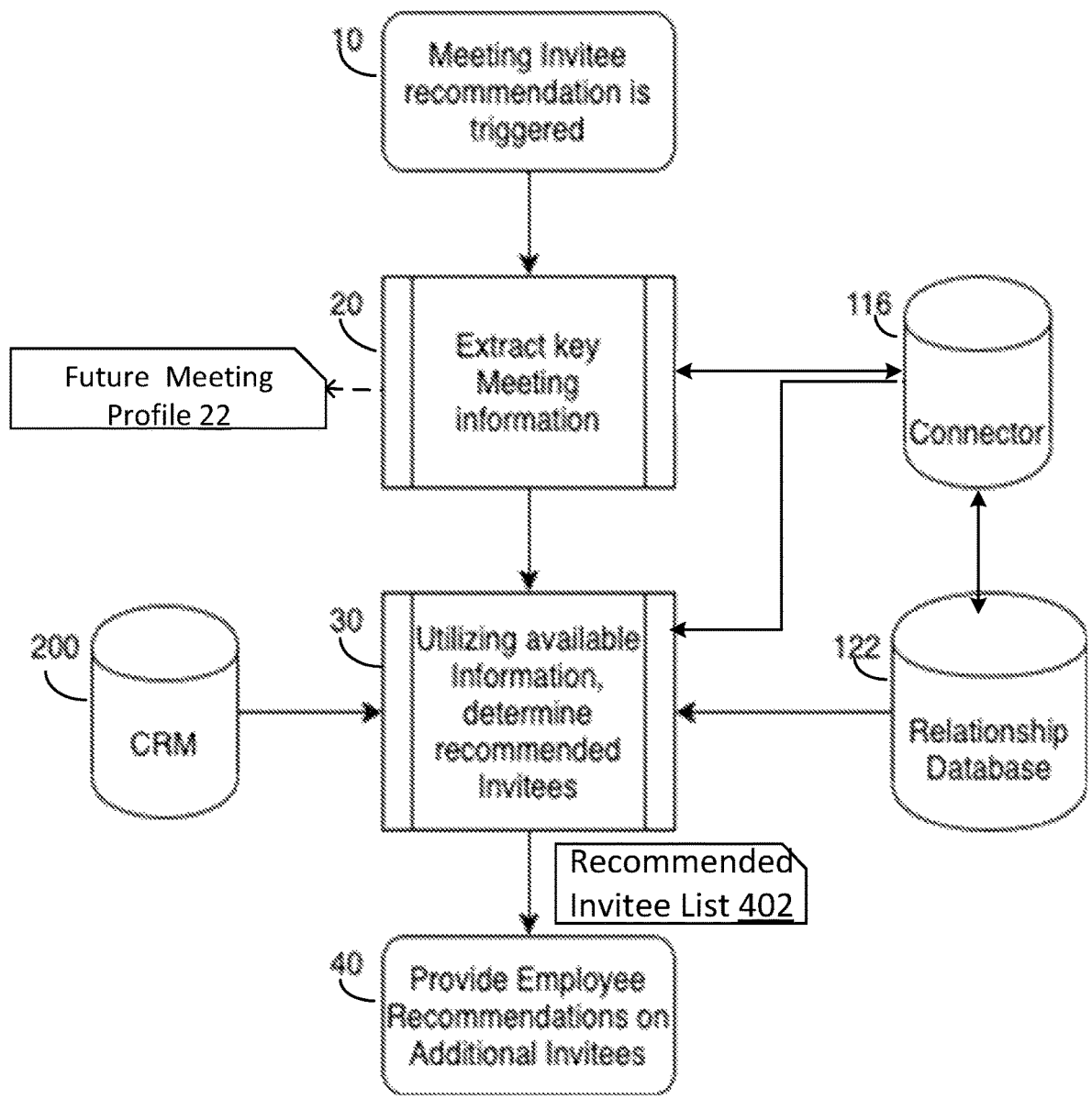
FIG. 2 is a flow diagram illustrating steps taken by an invitee recommendation module in accordance with an example embodiment of the present disclosure.

FIG. 2 is a flow diagram illustrating steps taken by, or caused to be taken by, the invitee recommendation module 118 in accordance with an example embodiment of the present disclosure.

Step 10—A meeting invitee recommendation process is triggered. In example embodiments, the process may be triggered when the meeting organizer (for example an enterprise user 182) starts organizing a meeting and adding invitations in an email system.

Figure 3:
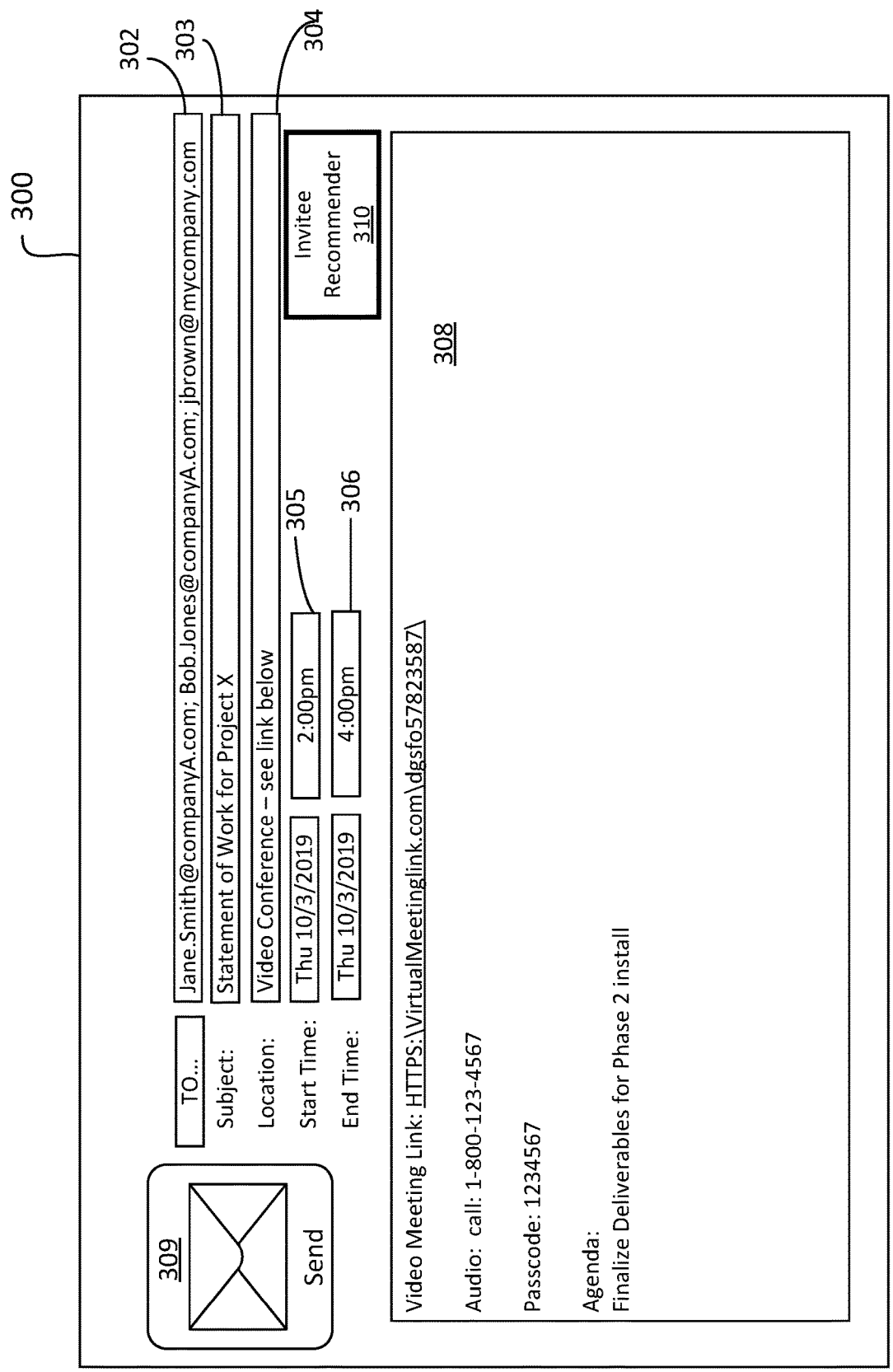
FIG. 3 is an example of a user interface display presented on a user equipment device.

By way of example, an enterprise user 182 may interact with a user interface provided by PIM module 106 of the user's UE device 104 to schedule an future meeting with multiple meeting participants that will typically include the meeting organizer and one or more additional invitees. In this regard, FIG. 3 illustrates an example of an interactive "meeting request" form 300 that is presented on a display screen of a UE device 104 that allows a user 182 to generate an email request for a future meeting. Meeting Request form 300 has features common to known "meeting request" interface forms (for example, the meeting request form generated by the Microsoft Outlook™ PIM software), including a set of interactive fields that can be populated by the meeting organizer: a "TO" field 302 for email addresses of meeting invitees; a "Subject" or title field 303 that includes categorical information about the nature of the meeting; a "Location" field 394 that can include categorical information about the planned meeting location (Room name or number and physical address) and/or meeting type (e.g., physical in-person meeting, and/or virtual meeting that includes one or more of an audio link, video link and/or screen sharing); "Start Time" and "End Time" fields 305, 306 that specify proposed start and end times (date(s) and times); and an "Additional Details" field 308 that can include additional information such as additional physical address information, virtual address information (e.g., virtual meeting link and audio link information), agenda information, etc. In at least some examples, the "Additional Details" field 308 can, among other things, include content from an email thread leading up to the meeting invite.

Similar to known meeting request interfaces, Meeting Request form 300 includes a user selectable "send" option (e.g., send button 309) that causes an electronic meeting request that includes the data from meeting request form fields 302 to 308 to be generated and sent through an email system (which may include mail server 112) to the identified invitee email addresses. As known in the art, sending of the electronic meeting request causes a meeting event to be scheduled in a calendar function of the PIM module 106 of the meeting organizer, which will also track which invitees send meeting "decline", "tentative" or "accept" replies.

In at least some example embodiments, the generation and sending of the electronic meeting request based on meeting request form 300 is a communication activity that is tracked by CRM support system 120, through the periodic monitoring and tracking activities as described above, resulting in generation of a corresponding meeting activity record 138 at relationship data storage 122. In example embodiments, CRM support system 120 populates some of the data fields of the meeting activity record 138 with corresponding information from the fields 302 to 308. In some examples, CRM support system 120 automatically populates some of the data fields of the meeting activity record 138 by correlating data included in the meeting request with information included in relationship data storage 122. For example, the email addresses of meeting invitees can be correlated with account data 126, contact data 130, opportunity data 128 and user-contact data 30 to identify an opportunity ID to assign to meeting, an account ID to assign to the meeting, an average enterprise-contact relationship score of invitees for the meeting and an average title score of invitees for the meeting. In this manner, the CRM support system 120 builds up a database of historic meeting activity records 138 that can be used to perform the analysis described in greater detail below.

Referring again to FIG. 3, in an example embodiment, meeting request interface 300 includes a novel user-selectable "invitee recommender" option. In the illustrated example, the "invitee recommender" option takes the form of user selectable button 310 that is generated by a software plugin (also referred to as an add-on or add-in) component that is associated with invitee recommendation module 118 and functions as a plugin to PIM module 106. The "invitee recommender" plugin component enables a meeting organizer to trigger the invitee recommendation process of FIG. 2 from the meeting request interface 300, prior to sending the meeting request.

Step 20—Referring again to FIG. 2, in example embodiments, once triggered, the invitee recommendation module 118 is configured to extract key meeting information about the meeting being scheduled such as, but not limited to, the meeting title, meeting location, meeting participants, (including the meeting organizer, existing meeting invitees in addition to the meeting organizer, titles of invitees, and the department of invitees). In particular, in an example embodiment, in step 20, invitee recommendation module 118 is configured to generate a future meeting profile 22 for the meeting being scheduled. In an example embodiment, the feature attributes included in the future meeting profile 22 may come from or be based on one or more of the following: (1) information included in the fields of the meeting request form 300; (2) information retrieved by invitee recommendation module 118 from relationship storage 122 (for example, by queries made through connector 116); and (3) information retrieved by invitee recommendation module 118 from CRM system 200 (for example, by queries made through CRM agent 119).

Table 8 below provides an example of some or all of the attributes that may be included in the future meeting profile 22:

TABLE 8

Future Meeting Profile 22:

| Attribute | Description |
|---|---|
| (1) Information Extracted from Meeting Request Form 300: | |
| Meeting ID | Unique identifier assigned to meeting (e.g., may be value assigned by scheduling PIM module based on one or more of time stamp and meeting organizer ID) |
| Meeting Organizer | Identifier (e.g., email address) of meeting organizer |
| Subject | Information included in meeting "Subject" field 303 |
| Location | Information included in meeting "Location" field 304 |
| Start Time | Scheduled Start Date and Time for meeting (Field 305) |
| End Time | Scheduled End Date and Time for meeting (Field 306) |
| Additional Information | Additional descriptive information about meeting (e.g., information included in the field 308) |
| Invitee Email Addresses | Email addresses of invitees included in the "TO" field 302 (in example embodiments, individual email addresses may be automatically extracted from any group email addresses included in TO field 302). |
| Meeting Type | Meeting Type: In-person Virtual Combination of In-Person and Virtual (In example embodiments, module 118 may be configured to predict a probable meeting type by applying string matching techniques to text information included in one or more of fields 303, 304 and 308) |
| (2) Information Extracted from Relationship Data Storage 122 Based on Meeting Request Form 300 (e.g., may be determined by cross-referencing email addresses from field 302 with data objects 124): | |
| Internal Invitee IDs | User IDs for the meeting organizer and other invitees who are enterprise users (e.g., may be determined by cross-referencing email addresses from field 302 with user data 132 records) |
| Internal Invitee Titles | Title of each invited enterprise user (including meeting organizer and all |

TABLE 8-continued

Future Meeting Profile 22:

| Attribute | Description |
|---|---|
| | other invitees) e.g., from user data 132 records) |
| Internal Invitee Departments | Department of each invited enterprise user (e.g., from user data 132 records) |
| External Invitee IDs | Contact IDs for invitees who are members of external organizations - e.g. contacts 192 from accounts 190 (e.g., may be determined by cross-referencing email addresses from field 302 with contact data 130 records) |
| External Invitee Titles | Title of each invited contact (e.g., from contact data 130 records) |
| External Invitee Title Scores | Title Score for each invited contact (e.g., from contact data 130 records) |
| External Invitee Departments | Department of each invited contact (e.g., from contact data 130 records) |
| User-Account Relationship Scores for External Invitees | User-Account Relationship Score for each invited contact (e.g., from contact data 130 records) |
| Account ID(s) | Identity of Account(s) whose contacts are included as invitees (e.g., from contact data 130 records, account data records 126) |
| Opportunity ID(s) | Identity of the opportunity(ies) that meeting is related to (e.g., from user data 132, contact data 130 records, opportunity data 128 records) |
| Opportunity Stage | Current stage of opportunity that meeting relates to (e.g., from opportunity data 128 records) |
| Average Enterprise-Contact Relationship Score | Average Enterprise-Contact Relationship Score of invitees for each identified account (e.g., from contact data 130 records) |
| Average Title Score | Average Title score of invitees for each identified account (e.g., from contact data 130 records |

In at least some example embodiments the Future Meeting Profile 22 can be used by CRM support system 120 to generate a corresponding meeting activity record 138 that includes fields that correspond to the attributes shown in Table 8 above and is stored as part of activity data 136, thereby building up a database of historic meeting data that can be used for future analysis.

Step 30—In example embodiments, invitee recommendation module 118 is configured to utilize the information obtained in Step 20, retrieve additional information from the relationship data storage 122 (and CRM system 200 if required), and determine recommended invitees. An example of the process flow for the determination of the recommendation will now be further explained with reference to FIG. 4.

Figure 4:
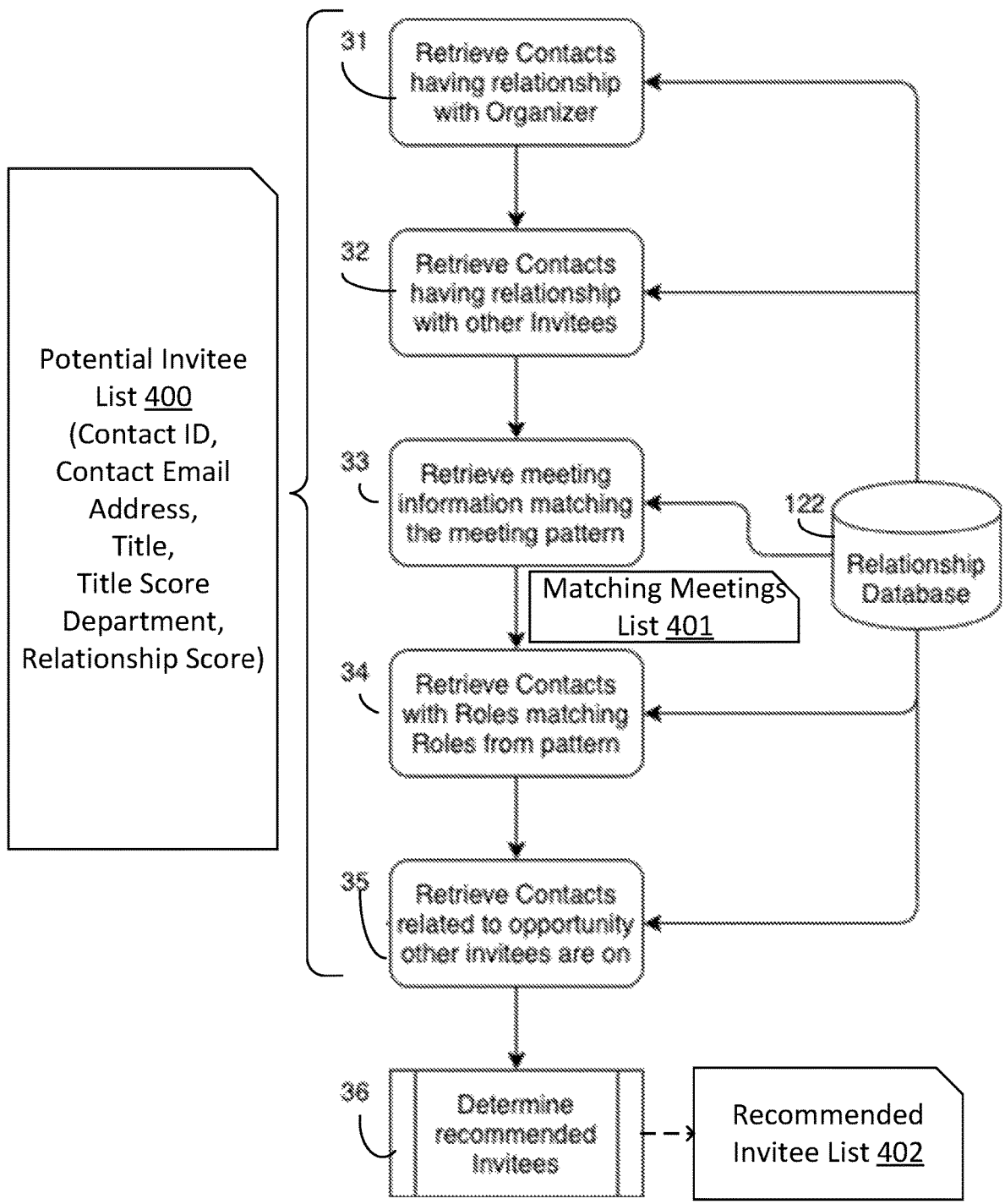
FIG. 4 is a flow diagram illustrating steps taken by an invitee recommendation module in accordance with an example embodiment of the present disclosure.

As indicated in FIG. 4, Step 30 comprises a set of sub-processes or steps 31 to 35 that are used to automatically generate a potential invitee list 400 based on the future meeting profile 22 generated in step 20. Potential invitee list 400 includes information about potential invitees that are not already included in the scheduled email invite list (e.g., individuals who do not already have an email address are not already included in the "TO" field 302).

Step 31: Identify contacts from the relationship database 122 that the meeting organizer has an existing relationship with, and retrieve their contact information. In an example embodiment, the meeting organizer's User ID and Account ID(s) included in the future meeting profile 22 can be cross referenced with the user-contact relationship data 134 included in relationship data storage 122 to identify the Contact IDs of all contacts that the meeting organizer has existing relationship with at the account(s) 190 that the existing invitees are associated with. Based on this information, a list of the meeting organizers existing contacts at the account, who are not already included as meeting invitees, is generated and added to the potential invitee list 400. In some examples, the following information from data objects 124 is retrieved and included in potential invitee list 400 for each of these contacts: Contact ID, Contact Email Address, Title, Title Score Department, and Relationship Score (e.g., Contact-Enterprise Relationship Score). In some examples, automated filtering based on predetermined parameters could be could be applied at step 31 to filter out some of the identified contacts so that they are not added to the potential invitee list 400. For example, contacts that do not meet predefined relationship score criteria may be excluded from addition to list 400 (e.g., have a Contact-Enterprise Relationship Score below a first threshold and/or a User-Contact Relationship Score with the meeting organizer that is below a second threshold).

Step 32: Identify contacts from the relationship database 122 that have a relationship with other meeting invitees, and retrieve their contact information. In an example embodiment, the User ID's of the users 182, other than the meeting organizer, within the enterprise 180 that are included as invitees to the meeting (referred to as "other enterprise invitees") and the Account ID(s) included in the future meeting profile 22 can be cross referenced with the user-contact relationship data 134 included in relationship data storage 122 to identify the Contact IDs of all contacts that the meeting's other enterprise invitees have existing relationships with at the account(s) 190 that the existing invitees are associated with. Based on this information, a list of the other enterprise invitees' contacts at the account, who are not already included as meeting invitees, is generated and added to the potential invitee list 400. In some examples, the contact information noted above in respect of step 31 is also retrieved from data objects 124 and included in potential invitee list 400 for each of these additional potential invitees. In some examples, pre-filtering and exclusion of potential invitees can also be performed as noted above in respect of step 31.

Step 33: Identify past meetings that have a pattern that matches the meeting that is currently being scheduled, and include meeting and/or activity ID for such meetings in a matching meeting list 401. In example embodiments, pattern matching may be based on identifying meetings with similar topics (e.g., similar subjects), meetings at similar stages of an opportunity, meetings that had similar roles (e.g. contacts and users with similar titles and from similar departments) involved, as well as meetings with most of the same invitees.

By way of example, matching algorithms such as text matching algorithms could be applied to compare a plurality of the attributes included in the future meeting profile 22 for the current meeting with the corresponding fields of the meeting activity records 138 included in activity data 136. A similarity value may be computed for each of the respective attributes, and the k-closest historic meetings selected. In example embodiments, different attributes may have a higher weight than other attributes when determining similarities for the scheduled meeting profile with past meetings, for example meetings with the same account may be weighted higher than meetings with different accounts, meetings at the same stage in an opportunity may be given a higher weight, etc.

In some example embodiments meetings that may otherwise be a match to the future meeting profile 22 are subjected to additional filtering prior to being included on matching meeting list 401. For example, historic meetings that are associated with opportunities that have closed unsuccessfully (e.g., opportunities that have a negative "Won Indicator" in opportunity data 128) may be excluded from matching meeting list 401. In some examples, only historic meetings that are closed and associated with a positive outcome (e.g., opportunities that have a positive "Won Indicator" in opportunity data 128) are included in matching meeting list 401. In some examples, meetings that are associated with opportunities that fall below a defined deal size may be excluded from the matching meeting list 401.

Accordingly, in example embodiments, a matching meeting list 401 is automatically generated that identifies a set of historic meetings that are similar, based on pre-defined criteria, to the currently scheduled meeting, and which, in at least some examples, also meet a pre-defined success criteria.

Step 34: Identify contacts from the relationship database 122 that have a role similar to roles of the invitees included in matching meeting list 401, and retrieve their contact information. In example embodiments, the presently disclosed recommendation system assumes that having a similar mix of individuals, as represented by the roles of such individuals, at a scheduled meeting as have been involved in similar historic meetings may improve a successful outcome. In example embodiments, an individual's role is a combination of that individual's title and department. In an example embodiment, invitee recommendation module 118 is configured to determine, for the meetings identified in matching meeting list 401, the roles of the individuals (in some examples both contacts 192 and users 182) that have attended such meetings, and select account contacts 182 (e.g., individuals who represent the account(s) identified in the future meeting profile 22) that have similar roles to the invitees to the meetings included in matching meeting list 401, and include such selected account contacts (and their related data) in the potential invitee list 400.

The role matching of step 34 can be performed in a number of different ways. In one example embodiment, the title scores of the contacts at the time that they attended the meetings are treated as a proxy for title, and individual contacts with the same title scores as identified as attending past meetings are added to the potential invitee list 400. In some examples, text matching algorithms are applied to one or both of the "title" and "department" attributes of contacts included in contact data 26 relating to the identified account (s) and the contacts that meet predefined matching criteria are selected as having roles that are similar to those individual contacts who participated in past meetings. In some examples, pre-filtering and exclusion of potential invitees can also be performed as noted above in respect of step 31.

Step 35: Identify account contacts from the relationship database 122 that are associated with open opportunities that the existing invitees are associated with. As noted above, one of the attributes that may be included in future meeting profile 22 is a list of all the open opportunities that invitees contacts are involved in, determined by cross-referencing user data 132, contact data 130 and opportunity data 128. In example embodiments, all other contacts 192 that are identified in data objects 124 as being involved in the existing open opportunities listed in the future meeting profile 22 are selected for inclusion in potential invitee list 400, along with their associated contact data. In some examples, pre-filtering and exclusion of potential invitees can also be performed as noted above in respect of step 31. In this regard, potential contacts that may be relevant to an opportunity but have otherwise been overlooked by the meeting organizer may be included in potential invitee list 400.

Accordingly, at the completion of step 36, potential invitee list 400 is generated that includes information about individuals who were not originally included in the meeting scheduling form 300 by the meeting organized.

Step 36: Data from the future meeting profile 22, potential invitee list 400, and in some examples, matching meeting list 401, is processed to generate a recommended invitee list 402. In example embodiments one or more predefined filtering models may be applied to select potential invitees from the potential invitee list 400 for inclusion on the recommended invitee list 402. The filtering models could include one or more defined rule-based filtering models and one or more machine learning based filtering models that have been trained using historical data or using other machine learning techniques.

Among other things, factors that may be considered when selecting recommended invitees as part of step 36 (and other sub-steps of step 30) can include: relationships such as, but not limited to, contacts from the same company, contacts with a similar title score or role, contacts that were copied on emails with existing meeting invitees, contacts that were invited to similar meetings in the past (based on meeting title, location and list of invitees), contacts associated to any opportunities with existing invitees' companies, any meeting organizer co-workers that have a relationship with any of the potential invitees, and any contacts associated to any opportunities with existing invitees' companies that have a role that was identified from the meeting pattern and is currently not invited.

In some example embodiments, the same potential invitee may be potentially identified and added to list 400 at a number of steps 31, 32, 34 and 35. In some examples, potential invitees may be ranked by the number of times that they are included in the list 400, and up to a defined number of the highest ranking potential invitees then selected for inclusion in recommended invitee list 402. In some example embodiments, ranking may be done based on one or more relationship scores (e.g. Enterprise-contact relationship scores of contacts included in list 400). In some example embodiments, ranking may be based on a combination of attributes.

Step 40: Provide the meeting organizer with recommendations on additional invitees for the meeting. Referring again to FIG. 2, in example embodiments the recommended invitee list 402 is provided to the meeting organizer. The list can be presented in a variety of formats, one example of which is illustrated in FIG. 5. In the example of FIG. 5, the recommended invitee list 402 is presented by the plugin associated with invitee recommendation module 118 as a window or interactive panel 500 in the user interface that presents interactive meeting request form 300. In the illustrated example, invitee identifiers in the form of recommended invitee email addresses are displayed in panel 500, along with invitee role information (e.g., title and department). Other information can be displayed including relationship strength scores and opportunity name.

In an example embodiment, interactive panel 500 is configured with input features 504, 510 to enable a user (e.g., the meeting organizer) to select one or more of the listed invitees for addition to the meeting request form 300. For example, user input selecting the "DONE" feature button 510 can cause the email addresses of any of the listed invitees that have been selected by the user via a respective selection box function 504 to be automatically appended to list existing email addresses included in "TO" field 302 of meeting request from 300. Selection of the "Send" option 309 then causes PIM module 106 to create and send a corresponding meeting request email to the identified invitees included in field 302.

Step 40—In an alternate embodiment, the recommended Invitees would be presented to the meeting organizer in a panel add-on in the email or calendar system being used by the meeting organizer. As described above, sending of the meeting invite can result in a respective meeting activity record 138 being created at the relationship data storage 122.

Although the process of FIGS. 2 and 3 has been described as occurring as part of an interactive process when a meeting organizer is organizing a meeting, in example embodiments the process may be performed after an initial invite has been sent out. For example, invitee recommendation module 118 could be configured to scan all new meeting invitations generated by a meeting organizer within a defined time period (e.g. in last day, in last week) and generate a respective invitee recommendation list 402 for each scheduled meeting as part of a batch process. A combined list could then be provided by email or through a display panel to the meeting organizer to act on as desired. Such a configuration may reduce the amount of processing required at meeting organizer's UE device 104 during the time that a meeting request is being generated, and may allow some or all of the functionality of invitee recommendation module to be located at a server in enterprise network 110 or at CRM support system 120.

Figure 6:
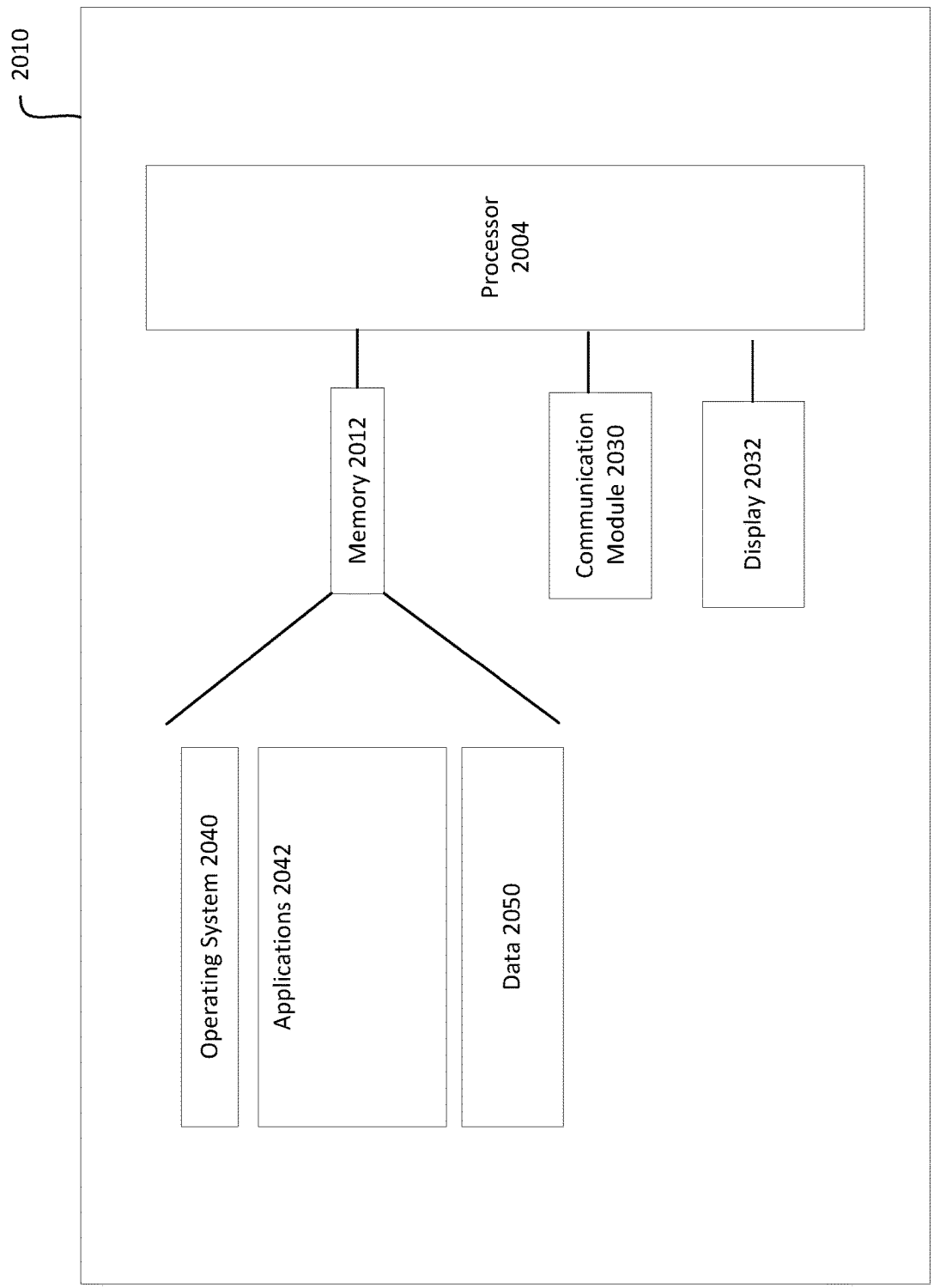
FIG. 6 is a simplified block diagram illustrating an example computer system for implementing one or more of the systems, modules and components shown in the environment of FIG. 1.

Referring to FIG. 6, an example embodiment of a computer system 2010 for implementing one or more of the modules, systems and agents included in enterprise network 110, CRM system 200 and CRM support system 120, and UE device(s) 104 will be described. In example embodiments, computer system 2010 may be a computer server. The system 2010 comprises at least one processor 2004 which controls the overall operation of the system 2010. The processor 2004 is coupled to a plurality of components via a communication bus (not shown) which provides a communication path between the components and the processor 2004. The system comprises memories 2012 that can include Random Access Memory (RAM), Read Only Memory (ROM), a persistent (non-volatile) memory which may one or more of a magnetic hard drive, flash erasable programmable read only memory (EPROM) ("flash memory") or other suitable form of memory. The system 2010 includes a communication module 2030.

The communication module 2030 may comprise any combination of a long-range wireless communication module, a short-range wireless communication module, or a wired communication module (e.g., Ethernet or the like) to facilitate communication through communication network 150.

Operating system software 2040 executed by the processor 2004 may be stored in the persistent memory of memories 2012. A number of applications 2042 executed by the processor 2004 are also stored in the persistent memory. The applications 2042 can include software instructions for implementing the systems, methods, agents and modules described above (including for example invitee recommendation module 118).

The system 2010 is configured to store data that may include data objects 124 in the case of CRM support system 120. The system 2010 may include an interactive display 2032 and other human I/O interfaces in the case of UE device 104.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure. All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer implemented method comprising:

storing, by one or more processors, as part of electronically stored relationship data, user data identifying a plurality of individual users that are associated with a first entity and the individual users' respective user email addresses, and contact data identifying a plurality of individual contacts associated with a second entity and the individual contacts' respective contact email addresses;

monitoring, by the one or more processors, emails exchanged through an enterprise mail server of the first entity and automatically extracting email communication data including email addresses included in one or more of From, To and Carbon copy (Cc) fields of the emails;

identifying, by the one or more processors, based on comparing the extracted email communication data with the user data and the contact data, emails that are exchanged between one or more of the individual users with one or more of the individual contacts and storing, as part of the electronically stored relationship data, for each identified email, activity data that includes: (i) time stamp data for the email and; (ii) participant data that identifies the one or more individual users and the one or more individual contacts whose email addresses are included in one or more of the From, To or Cc fields of the identified email;

computing, by the one or more processors, respective user-contact relationship scores between respective individual users from the one or more individual users and respective individual contacts from the one or more individual contacts, each respective user-contact relationship score representing a relationship strength between the respective individual user and the respective individual contact based at least in part on a user-contact communication score that is a function of the number of the identified emails for which the respective individual user and the respective individual contact are both identified in the participant data;

storing as part of electronically stored relationship data, by the one or more processors, the computed user-contact relationship scores;

receiving, by the one or more processors, a list of invitees for a future meeting, the list of invitees including at least one of the individual contacts associated with the second entity;

selecting, by the one or more processors, one or more additional individual contacts from the plurality of individual contacts associated with the second entity based on the user-contact relationship scores; and adding, by the one or more processors, the one or more selected additional individual contacts to a potential invitee list for the future meeting.

2. The method of claim 1, wherein the contact data includes role information that indicates, for at least some of the plurality of individual contacts, a title score representative of a role of the individual contact within a hierarchy of the second entity, and the respective user-contact relationship scores computed in respect of the individual contact are based on a user-contact relationship function that combines the title score of the individual contact with the user-contact communication score.

3. The method of claim 2, comprising:

identifying invitees to past meetings, by the one or more processors, based on email communication data extracted from meeting request emails, the user data and the contact data; and storing, by the one or more processors, as part of the electronically stored relationship data, historic meeting data that includes, for each of a plurality of past meetings, information indicating the identified invitees and the time data;

accessing, by the one or processors, the historic meeting data about a plurality of past meetings that included invitees who are individual contacts associated with the second entity;

wherein selecting one or more of the additional individual contacts is further based on the title scores of the invitees for the past meetings.

4. The method of claim 1, wherein the electronically stored relationship data includes opportunity data that identifies one or more open or closed business opportunities between the first entity and the second entity, and the electrically stored relationship data indicates, for at least some of the one or more of the individual users, the business opportunities that the individual user is associated with and, for at least some of the one or more of the individual contacts, the business opportunities that the individual contact is associated with, the method comprising:

identifying, by the one or more processors, based on the stored relationship data, a set of potential invitees that includes one or more of the individual contacts who are not included in the list of invitees but are associated with at least one business opportunity that one or more of the individual contacts or individual users who is included in the list of invitees is associated with;

wherein selecting the one or more of the additional individual contacts is also based on the identified set of potential invitees.

5. The method of claim 1, wherein the respective user-contact relationship scores are based on a frequency of the identified emails within a defined duration for which the respective individual user and the respective individual contact are both identified in the participant data.

6. The method of claim 1, comprising: generating, by the one or more processors, a user interface output that presents at least some of the individual contacts included in the potential invitee list for the meeting organizer and, upon detecting a user input selecting one or more of the at least some of the individual contacts, automatically adding email addresses for the selected one or more of the at least some of the individual contacts to an interactive meeting email request form as additional invitees for the future meeting.

7. The method of claim 1, wherein the future meeting is organized by a meeting organizer who is one of the individual users, wherein selecting the one or more additional individual contacts comprises selecting individual contacts associated with the second entity that have respective user-contact relationship scores with the meeting organizer that meet defined criteria.

8. The method of claim 7, wherein the list of invitees includes at least one further individual user that is not the meeting organizer, wherein selecting the one or more additional individual contacts comprises selecting one or more individual contacts associated with the second entity that have respective user-contact relationship scores with the at least one further individual user that meet defined criteria.

9. The method of claim 1, comprising:

creating and storing, by the one or more processors, historic meeting profiles for a plurality of past meetings that have included one or more of the individual users associated with the first entity and one or more of the individual contacts associated with the second entity, each historic meeting profile including a set of historic meeting attributes that indicate: (i) identities of participants in the past meeting, including: a meeting organizer, internal meeting invitees that are individual users associated with the first entities, and external meeting invitees that are individual accounts associated with the second entity; (ii) title scores for each of the external meeting invitees that are representative of a position of the external meeting invitee within a hierarchy of the second entity; (iii) a business opportunity ID that indicates a business opportunity that the past meeting is associated with; and (iv) relationship data based on the user-contact relationship scores of the identified participants in the past meeting;

generating, by the one or more processors, a future meeting profile for the future meeting, the future meeting profile including a set of future meeting attributes that indicate: (i) identities of intended participants for the future meeting, including: a meeting organizer, internal meeting invitees that are individual users associated with the first entities, and external meeting invitees that are individual accounts associated with the second entity; (ii) title scores for each of the external meeting invitees that are representative of a position of the external meeting invitee within a hierarchy of the second entity; (iii) a business opportunity ID that indicates a business opportunity that the past meeting is associated with; and (iv) relationship data based on the user-contact relationship scores of the identified participants in the past meeting;

wherein selecting the one or more additional individual contacts comprises: comparing, by the one or more processors applying a similarity matching algorithm, at least some of the future meeting attributes for the future meeting with corresponding historic meeting attributes for a plurality of the past meetings to generate a matching meeting list of past meetings, wherein at least one or more of the additional individual contacts are selected from individual contacts that are identified as external meeting invitees for one or more of the past meetings included in the matching meeting list.

10. A system for determining potential invitees for a meeting, the system comprising one or more processors and one or more non-transitory storage mediums coupled to the one or more processors, the one or more storage mediums storing software instructions that when executed by the one or more processors configure the system to:
  store, as part of electronically stored relationship data, user data identifying a plurality of individual users that are associated with a first entity and the individual users' respective user email addresses, and contact data identifying a plurality individual contacts associated with a second entity and the individual contacts' respective contact email addresses;
  monitor emails exchanged through an enterprise mail server of the first entity and automatically extract email communication data including email addresses included in one or more of From, To and Carbon copy (Cc) fields of the emails;
  identify, based on the extracted email communication data, the user data and the contact data, emails that are exchanged between one or more of the individual users with one or more of the individual contacts and storing, as part of the electronically stored relationship data, for each identified email, activity data that includes: (i) time stamp data for the email and; (ii) participant data that identifies the one or more individual users and the one or more individual contacts whose email addresses are included in one or more of the From, To or Cc fields of the identified email;
  compute respective user-contact relationship scores between respective individual users from the one or more individual users and respective individual contacts from the one or more individual contacts, each respective user-contact relationship score representing a relationship strength between the respective individual user and the respective individual contact based at least in part on a user-contact communication score that is a function of the number of the identified emails for which the respective individual user and the respective individual contact are both identified in the participant data;
  store, as part of electronically stored relationship data, the computed user-contact relationship scores;
  receive a list of invitees for a future meeting, the list of invitees including at least one of the individual contacts associated with the second entity;
  select one or more additional individual contacts from the plurality of individual contacts associated with the second entity based on the user-contact relationship scores; and
  add the one or more selected additional individual contacts to a potential invitee list for the future meeting.

11. The system of claim 10, wherein the contact data includes role information that indicates, for at least some of the plurality of individual contacts, a title score representative of a role of the individual contact within a hierarchy of the second entity, and the respective user-contact relationship scores computed in respect of the individual contact are based on the indicated role of the individual.

12. The system of claim 11, wherein the system is configured to identify invitees for past meetings based on email communication data extracted from meeting request emails, the user data and the contact data; and
  store as part of the electronically stored relationship data, historic meeting data that includes, for each of a plurality of past meetings, information indicating the identified invitees and the time data; and
  access the historic meeting data about a plurality of past meetings that included invitees who are individual contacts associated with the second entity;
  wherein selecting the one or more of the additional individual contacts is further based on title scores of the invitees for the past meetings.

13. The system of claim 10, wherein the electronically stored relationship data includes opportunity data that identifies one or more open or closed business opportunities between the first entity and the second entity, and the electrically stored relationship data indicates, for at least some of the one or more of the individual users, the business opportunities that the individual user is associated with and, for at least some of the one or more of the individual contacts, the business opportunities that the individual contact is associated with, and the one or more processors configure the system to:
  identify, based on the electrically stored relationship data, a set of potential invitees that includes one or more of the individual contacts who are not included in the list of invitees but are associated with at least one business opportunity that one or more of the individual contacts or individual users who is included in the list of invitees is associated with;
  select the one or more of the additional individual contacts for addition to the potential invitee list also based on the identified set of potential invitees.

14. The system of claim 10, wherein the respective user-contact relationship scores are based on a frequency of the identified emails within a defined duration for which the respective individual user and the respective individual contact are both identified in the participant data.

15. The system of claim 10, wherein the future meeting is organized by a meeting organizer who is one of the individual users, wherein the one or more additional individual contacts are selected by selecting individual contacts associated with the second entity that have respective user-contact relationship scores with the meeting organizer that meet defined criteria.

16. The system of claim 15, wherein the list of invitees includes at least one further individual user that is not the meeting organizer, wherein the one or more additional individual contacts are selected by further selecting one or more individual contacts associated with the second entity that have respective user-contact relationship scores with the at least one further individual user that meet defined criteria.

* * * * *